United States Patent
Kumar et al.

(10) Patent No.: US 10,924,305 B2
(45) Date of Patent: Feb. 16, 2021

(54) HDMI SKEW COMPENSATION COMMUNICATION

(71) Applicant: Intel Corporation, Santa Clara, CA (US)

(72) Inventors: Aruna Kumar, Bangalore (IN); Anoop Karunan, Bangalore (IN); Ganesh Balamurugan, Hillsboro, OR (US); Prakash Radhakrishnan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 16/305,116

(22) PCT Filed: Jun. 6, 2017

(86) PCT No.: PCT/US2017/036097
§ 371 (c)(1),
(2) Date: Nov. 28, 2018

(87) PCT Pub. No.: WO2018/005018
PCT Pub. Date: Jan. 4, 2018

(65) Prior Publication Data
US 2020/0328915 A1 Oct. 15, 2020

(30) Foreign Application Priority Data
Jun. 30, 2016 (IN) .............................. 201641022437

(51) Int. Cl.
*H04L 25/02* (2006.01)
*H04L 25/03* (2006.01)
(Continued)

(52) U.S. Cl.
CPC .......... *H04L 25/0272* (2013.01); *H04L 1/243* (2013.01); *H04L 7/10* (2013.01);
(Continued)

(58) Field of Classification Search
CPC ....... H04L 25/0272; H04L 7/10; H04L 1/243; H04L 25/03885; H04L 25/085; H04N 21/43635
See application file for complete search history.

(56) References Cited

U.S. PATENT DOCUMENTS

2005/0034007 A1 2/2005 Nemawarkar et al.
2005/0262280 A1* 11/2005 Cherukuri ........... G06F 13/4273
710/106
(Continued)

FOREIGN PATENT DOCUMENTS

WO 2012038546 A1 3/2012

OTHER PUBLICATIONS

International Search Report for the International Patent Application No. PCT/US2017/036097, dated Sep. 12, 2017.

*Primary Examiner* — Kenneth T Lam
(74) *Attorney, Agent, or Firm* — Kacvinsky Daisak Bluni PLLC (57) ABSTRACT

Disclosed herein are devices and methods to facilitate compensating for intra-pair skew in a high-definition multimedia interface (HDMI) system. One or more skew training pattern may be transmitted on a signal line including a differential pair. Acknowledgment of receiving the skew training pattern may be received on a display data channel (DDC) associated with HDMI system. The skew training pattern may be used to ascertain and compensate for intra-pair skew.

23 Claims, 6 Drawing Sheets

(51) Int. Cl.
*H04L 1/24* (2006.01)
*H04L 7/10* (2006.01)
*H04L 25/08* (2006.01)
*H04N 21/4363* (2011.01)

(52) U.S. Cl.
CPC ...... *H04L 25/03885* (2013.01); *H04L 25/085* (2013.01); *H04N 21/43635* (2013.01)

(56) References Cited

U.S. PATENT DOCUMENTS

| | | | | |
|---|---|---|---|---|
| 2007/0164802 | A1* | 7/2007 | Rea | H03K 19/01721 327/266 |
| 2009/0182917 | A1* | 7/2009 | Kim | G06F 3/1438 710/106 |
| 2011/0292295 | A1* | 12/2011 | Kawai | G06F 3/14 348/723 |
| 2012/0173769 | A1* | 7/2012 | Loo | G09G 5/006 710/14 |
| 2014/0119425 | A1* | 5/2014 | Boccaccio | H04L 25/03885 375/232 |
| 2014/0211095 | A1* | 7/2014 | Dickens | H04N 21/43635 348/723 |
| 2014/0240604 | A1* | 8/2014 | Toba | G09G 5/006 348/723 |
| 2015/0201146 | A1* | 7/2015 | Toba | G09G 5/006 348/725 |
| 2015/0341160 | A1* | 11/2015 | Takai | H04L 25/0274 375/346 |

\* cited by examiner

HDMI SKEW COMPENSATION COMMUNICATION

CROSS-REFERENCE TO RELATED APPLICATIONS

This application is a national phase claiming the benefit of and priority to International Patent Application No. PCT/US17/36097, filed Jun. 6, 2017, entitled "HDMI SKEW COMPENSATION COMMUNICATION," which claims the benefit of Indian Application No. 201641022437 filed Jun. 30, 2016, entitled "HDMI Skew Compensation Communication," which applications are incorporated herein by reference in their entirety.

TECHNICAL FIELD

Embodiments herein generally relate to high-definition multimedia interface (HDMI). More particularly, embodiments herein generally relate to skew correction communications in HDMI systems.

BACKGROUND

The digital interface technology HDMI (High Definition Multimedia Interface) is a leading standard for transmission of video signals and audio signals between devices, and has been widely used in the field of household electrical appliances and audiovisual devices. HDMI has been realized by further developing a digital visual interface (DVI) so that video signals, audio signals, and device control signals can be transmitted over a single cable.

Multiple versions of HDMI have been developed as bandwidth and/or other capabilities of audiovisual data transfer increase, with recent releases including HDMI versions 1.4 and 2.0. HDMI 2.0 supports a per-channel bandwidth of at least 6 Gbps. This bandwidth allows for higher-resolution audio and video transfer compared to earlier HDMI versions.

Visual display units, flat screens, displays, mobile devices, computers, television sets and monitors supporting high resolutions may include an electrical connection interface, such as a DVI data transmitting interface and/or HDMI data transmitting interface. In addition to various control signals, several differential transition minimized differential signaling (TMDS) encoded signals for the transmission of audio and video data as well as required clock signaling between at least one data source and at least one data sink are carried via this interface.

HDMI systems my operate in native or non-native mode. In particular, HDMI standards specify that native TMDS operation requires a 3.3 line voltage. However, some HDMI systems may not support the 3.3V requirement. Such HDMI systems are known as non-native.

The HDMI standards use three separate TMDS channels for the additive primary colors used in creating displayed video images. These signals are transmitted at a very high rate (GHz range). Even a small change in the propagation characteristics of the copper conductors used to carry the components can cause signal glitches. Intra-pair skew is defined as a difference in propagation speed between the positive and negative lines in a differential pair. A slight difference in arrival times for the two components of a pair can cause a data bit to fall outside of the decision boundary defined for that bit. For example, digital high signals can then become low and vice-versa.

Some non-native implementations make use of active level shifters (ALS) to compensate for skew associated with differential signal lines. However, use of ALS adds expense to HDMI systems.

DETAILED DESCRIPTION

Various embodiments may generally relate to high-definition multimedia interface (HDMI) systems. In particular, various embodiments may generally relate to HDMI systems that function in a non-native mode. Such HDMI systems may not provide the HDMI standard requirement of 3.3V on one or more differential transition minimized differential signaling (TMDS) line.

Implementations described herein provide skew compensation for signaling on differential lines. In one implementation, the skew compensation is associated with a non-native HDMI system. In a particular implementation, the skew compensation is applied to one or more TMDS line. Specifically, the skew compensation may be applied to one or more TMDS lines associated with a HDMI system. In one implementation, the skew compensation does not necessitate the use of an active level shifter (ALS). In a particular implementation, skew compensation is made possible by leveraging an existing HDMI standard mandated platform. In one implementation, a display data channel (DDC) may be used to enable skew compensation communications. The DDC may be used to carry extended display identification data (EDID) specified by HDMI standards. Various embodiments disclosed herein make use of the DDC to communicate skew and skew compensation information between an HDMI source and an HDMI sink.

More particularly, disclosed herein are devices and methods to facilitate compensating for intra-pair skew in HDMI systems. One or more skew training patterns may be transmitted or caused to be sent on a signal line including a differential pair. Acknowledgment of receiving the skew training pattern may be received on the DDC associated with a HDMI system. The skew training pattern may be used to ascertain and compensate for intra-pair skew, or more generally signal skew. Additional communications associated with skew training and skew compensation may be conveyed over the DDC.

In some examples, the present disclosure can be implemented by a Technical Specification, or by a device conforming to a Technical Specification. For example, some implementation of the disclosure can relate to the HDMI 2.0 Specification released on Sep. 4, 2013.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form in order to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Figure 1:
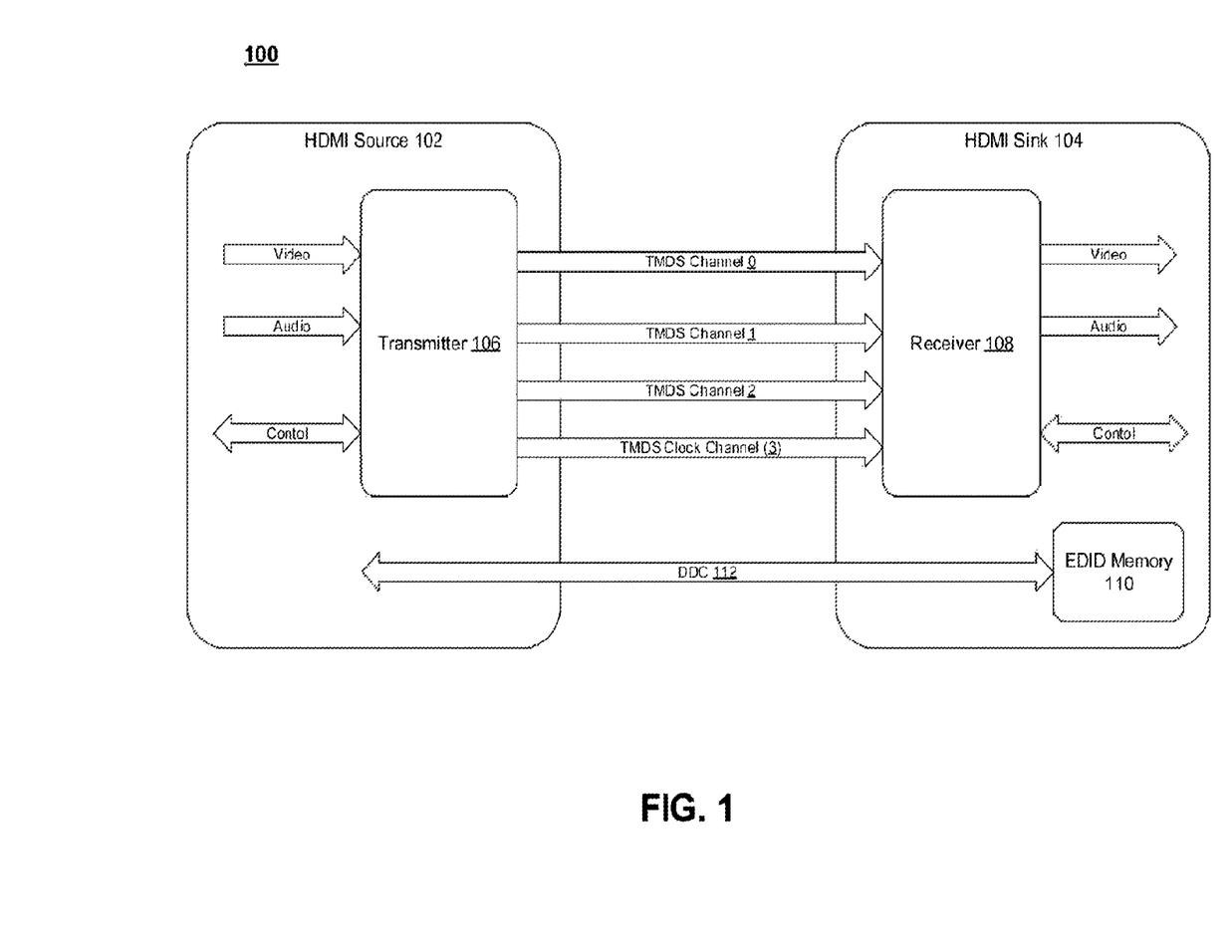
FIG. 1 is an illustrative block diagram of a system with an HDMI source coupled to an HDMI sink.

FIG. 1 is an illustrative block diagram of a system 100 with an HDMI source 102 coupled to an HDMI sink 104. HDMI sinks are typically a component that displays video or graphical images, such as a television, a computer monitor, a digital picture frame, etc. HDMI sources are typically components that provide the video or graphical images, such a cable or satellite conversion box, a DVD player, a camera, a game console, etc. Embodiments may include battery-less game consoles, dongles for receiving a wireless broadcast of a video or graphical stream, etc. Embodiments may also include battery powered devices such as cellular telephones, video or digital cameras, etc.

The current HDMI specification provides sufficient bandwidth for 4K video data encoded via TMDS. TMDS provides sufficient bandwidth for a wide variety of audio sample rates and formats, encoded via TMDS error reduction coding (TERC4). TERC4 encoding maps sixteen 4-bit characters to 10-bit symbols and includes signaling for guard bands. TERC4 symbols and guard band symbols, generally referred to as HDMI symbols, are 10-bits in length and have five logic ones and five logic zeros to ensure that they are DC balanced. HDMI links include three TMDS data channels, which carry the TMDS and TERC4 encoded data, and one TMDS clock channel.

Referring again to FIG. 1 the HDMI source 102, including a transmitter 106, communicates with the HDMI sink 104, including a receiver 108 and a memory (e.g., a read only memory (ROM)) 110 in some embodiments. The HDMI source 102 is any type and form of media source or media encoder, such as a DVD player, set top box, cable receiver, satellite receiver, terrestrial broadcast receiver, desktop computer, laptop computer, portable computing device, devices that receive and retransmit video (e.g. audio/video receivers and other), or any other such media source. The HDMI sink 104 is any type and form of media receiver and/or display, including but not limited to a monitor, a projector, a wearable display, a computer, a communication device, an audio/video switcher or multimedia receiver, or any other type and form of media receiving device.

The transmitter 106, in general the HDMI source 102, may include suitable logic, circuitry and/or code that may be configured to receive a number of input channels, such as video, audio and auxiliary data (e.g. control or status data) or data from a DDC 112 or other sideband communication channel (e.g., a USB bus, an Apple Desktop Bus, an RS-232 serial connection, a SCSI bus, a FireWire bus, a FireWire bus, an Ethernet bus, an AppleTalk bus, a Gigabit Ethernet bus, an Asynchronous Transfer Mode bus, a FibreChannel bus, a Serial Attached small computer system interface bus, a USB connection, or some other custom channel), and generate, transmit, and/or send data over a number of output TMDS data channels 0-2 and a TMDS clock channel. In some embodiments, the clock channel may be considered a TMDS data channel 3, providing additional bandwidth for transmission of compressed 8K video. The DDC 112 channel may be used for configuration and status exchange between the HDMI source 102 and the HDMI sink 104 in some embodiments. Each of the TMDS data channel 0-3 includes a differential pair. Intra-pair skew, related to transmitted signals, may manifest on one or more of the TMDS data channel 0-3. Intra-pair skew is defined as a time difference in propagation between two complementary signals transmitted through a differential channel, such as one of the TMDS data channels 0-3. The DDC 112 may be used to convey information pertaining to differential signal line skew and skew compensation.

The receiver 108, in general the HDMI sink 104, may comprise suitable logic, circuitry and/or code configured to receive a number of input TMDS data and clock channels, and may generate a number of output channels, such as video and audio channels and control information.

In addition to the foregoing, the HDMI source 102 and the HDMI sink 104 may be one or more fixed circuits, field programmable gate arrays (FPGAs), or other modules or combinations of circuits, or may comprise software executed by a processor, such as a microprocessor or central processing unit, including those manufactured by Intel Corporation of Mountain View, Calif.

Further to the foregoing, the HDMI source 102 and/or the transmitter 106 may include one or more fixed circuits, FPGAs, or other modules or combinations of circuits, or may comprise software executed by processor, such as a microprocessor or central processing unit, to generate skew training patterns, such as 1010, that may be conveyed to the HDMI sink 104 over one or more TMDS channel 0-3. The HDMI sink 104 and/or the receiver 108 may include one or more fixed circuits, FPGAs, or other modules or combinations of circuits, or may comprise software executed by processor, such as a microprocessor or central processing unit, to receive the skew training patterns provided by the HDMI source 102. Furthermore, HDMI sink 104 and/or the receiver 108 may include one or more fixed circuits, FPGAs, or other modules or combinations of circuits, or may comprise software executed by processor, such as a microprocessor or central processing unit, to analyze skew training patterns and provide results of such analysis to the HDMI source 102 and/or the transmitter 106. The HDMI source 102 and/or the transmitter 106 may include one or more fixed circuits, FPGAs, or other modules or combinations of circuits, or may comprise software executed by processor, such as a microprocessor or central processing unit, to receive such analysis and generate modified skew training patterns, such as 1010, that may be conveyed to the HDMI sink 104. In implementation, the HDMI source 102 and/or the transmitter 106 and the HDMI sink 104 and/or the receiver 108 may utilize the DDC 112 to convey information pertaining to signal skew on one or more TMDS channel 0-3, skew training patterns, and/or compensation of skew on one or more TMDS channel 0-3.

The memory 110 may comprise suitable logic, circuitry and/or code configured to store auxiliary data such as an EDID, which may be received from the DDC 112 or other sideband communication channel (e.g., a USB bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a FibreChannel bus, a serial attached small computer system interface bus, a USB connection, or some other custom channel). The memory 110 may comprise a serial programmable read only memory (PROM) or electrically erasable PROM (EEPROM), Random Access Memory (RAM), a read only memory (ROM) or any other type and form of memory.

Audio, video, auxiliary data, intra-skew training signals, may be transmitted or caused to be sent across a number of TMDS data channels 0-3. In some embodiments, video data is transmitted as 24-bit pixels on the number of TMDS data channels. TMDS encoding converts a number of bits, for example, 8 bits per channel into a 10 bit DC-balanced, transition minimized sequence in some embodiments. The sequence is transmitted serially at a rate of 10 bits per pixel clock period, or any other such rate in some embodiments. The video pixels are encoded in RGB, YCBCR 4:4:4 or YCBCR 4:2:2 formats, for example, and are transferred up to 24 bits per pixel, for example. In some embodiments, more than 24-bits per pixel (e.g. 30, 36, or 48 bits per pixel in addition to support for 24 bits per pixel) is provided. In some embodiments, as discussed above, pixels are compressed from a 4:4:4 or 4:2:2 24-bit per pixel scheme to an 8 bit per pixel format, such as via DSC compression. Other embodiments are capable of compressing 4:2:0 format pixels.

Figure 2:
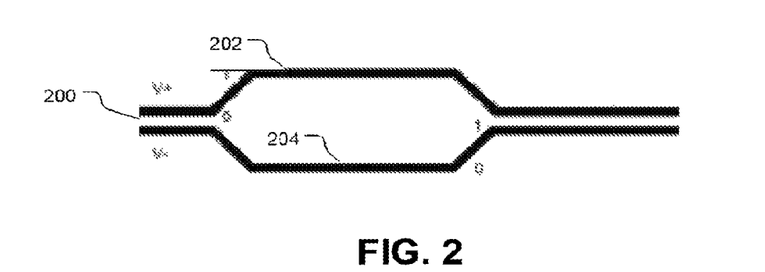
FIG. 2 illustrates a differential signal that may be transmitted over a differential pair.

FIG. 2 illustrates a differential signal 200 that may be transmitted over a differential pair. In one implementation, the differential signal 200 is transmitted over one or more TMDS channel 0-3 by way of the HDMI source 102. In particular, the differential signal may be transmitted by the HDMI source 102 to the HDMI sink 104 using one or more TMDS channel 0-3. Circuitry, hardware, software, or combination of circuitry, hardware, and software of the HDMI source 102 may generate the differential signal 200. Technically, the differential signal 200 includes a pair signals that are mirror images of each other. More particularly, the differential signal 200 includes a first signal 202 that has a positive going transition (+V). Furthermore, the differential signal 200 includes a second signal 204 that has a negative going transition (−V).

Ideally, the first signal 202 and the second signal 204 maintain precise timing as they undergo transmission from the HDMI source 102 to the HDMI sink 104. However, the first signal 202 and the second signal 204 generally traverse cables that are influenced by various imperfect conditions that may cause disruptions in the timing of the first signal 202 and the second signal 204. Such imperfect conditions include, for example, variations in the dielectric material used to insulate the cables to carry the first signal 202 and the second signal 204, variations in the twist and overall length of the cables, and so forth.

Figure 3:
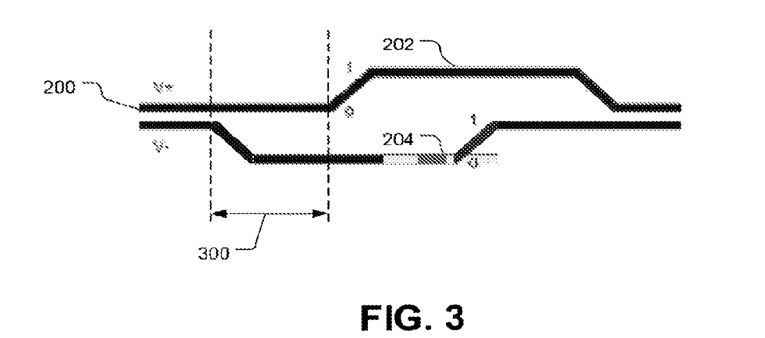
FIG. 3 illustrates the differential signal that may be received after it was transmitted over a differential pair.

FIG. 3 illustrates the differential signal 200 that may be received after it was transmitted over a differential pair. In one implementation, the differential signal 200 is a training differential signal 200 that is transmitted by the HDMI source 102 to the HDMI sink 104. The transmitted differential signal 200 may be received by the HDMI sink 104. As is shown in FIG. 3, the differential signal 200 is skewed in time. More specifically, an intra-pair skew 300 in the differential signal 200 (e.g., the first signal 202 and the second signal 204) was introduced during the transmission of the differential signal 200 from the HDMI source 102 to the HDMI sink 104.

Figure 4:
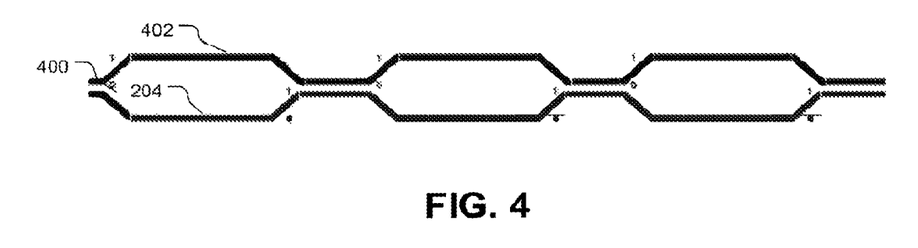
FIG. 4 illustrates a training differential signal that may be transmitted by an HDMI source to an HDMI sink.

FIG. 4 illustrates a training differential signal 400 that may be transmitted by the HDMI source 102 to the HDMI sink 104. The training differential signal 400 may have a different pattern than shown in FIG. 4. The training differential signal 400 may be analyzed by the HDMI sink 104 to determine if intra-pair skew was introduced in the differential signal 400 during the transmission of the signal 400 from the HDMI source 102 to the HDMI sink 104. The training differential signal 400 may include a first signal 202 that has a positive going transition (+V). Furthermore, the training differential signal 400 includes a second signal 204 that has a negative going transition (−V). In one example, the training differential signal 400 may be conveyed from the HDMI source 102 to the HDMI sink 104 using one or more of the TMDS channel 0-3. In a particular implementation, the training differential signal 400 is predetermined and known by the HDMI source 102 and the HDMI sink 104.

In one implementation, initially, the HDMI sink 104 may use the training differential signal 400 received from the HDMI source 102 as a baseline signal that is compared against a baseline eye pattern.

Figure 5:
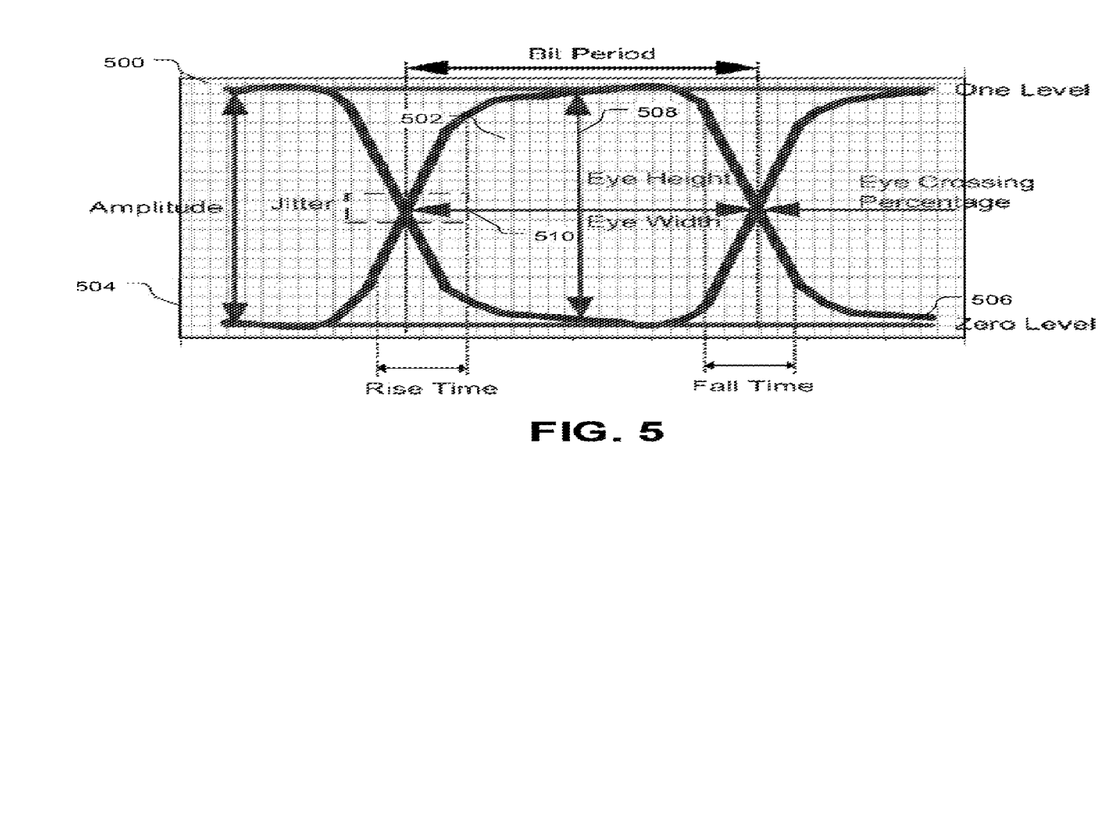
FIG. 5 illustrates an exemplary baseline eye pattern.

FIG. 5 illustrates an exemplary baseline eye pattern 500. The exemplary baseline eye pattern 500 includes an eye-opening 502. The y-axis 504 represents amplitude x-axis 506 represents time. Generally, the exemplary baseline eye pattern 500 includes a sum of samples from superimposing high and low signal samples with no skew introduced. The exemplary baseline eye pattern 500 includes an eye height 508 and an eye width 510. The eye height 508 is a measure of the vertical opening of the eye pattern 500 and the eye width 510 is a measure of the horizontal opening of the eye pattern 500. Skew associated with the training differential signal 400, caused during the transmission of the training differential signal 400 from the HDMI source 102 to the HDMI sink 104, may cause an eye height and/or eye width associated with the training differential signal 400 to deviate from a desired eye height and/or eye width, such as the eye height 508 and/or eye width 510 of the baseline eye pattern 500. The baseline eye pattern 500 may be stored in any suitable storage medium associated with a computing device, such as the HDMI sink 104, the computing device 600, and the like.

Figure 6:
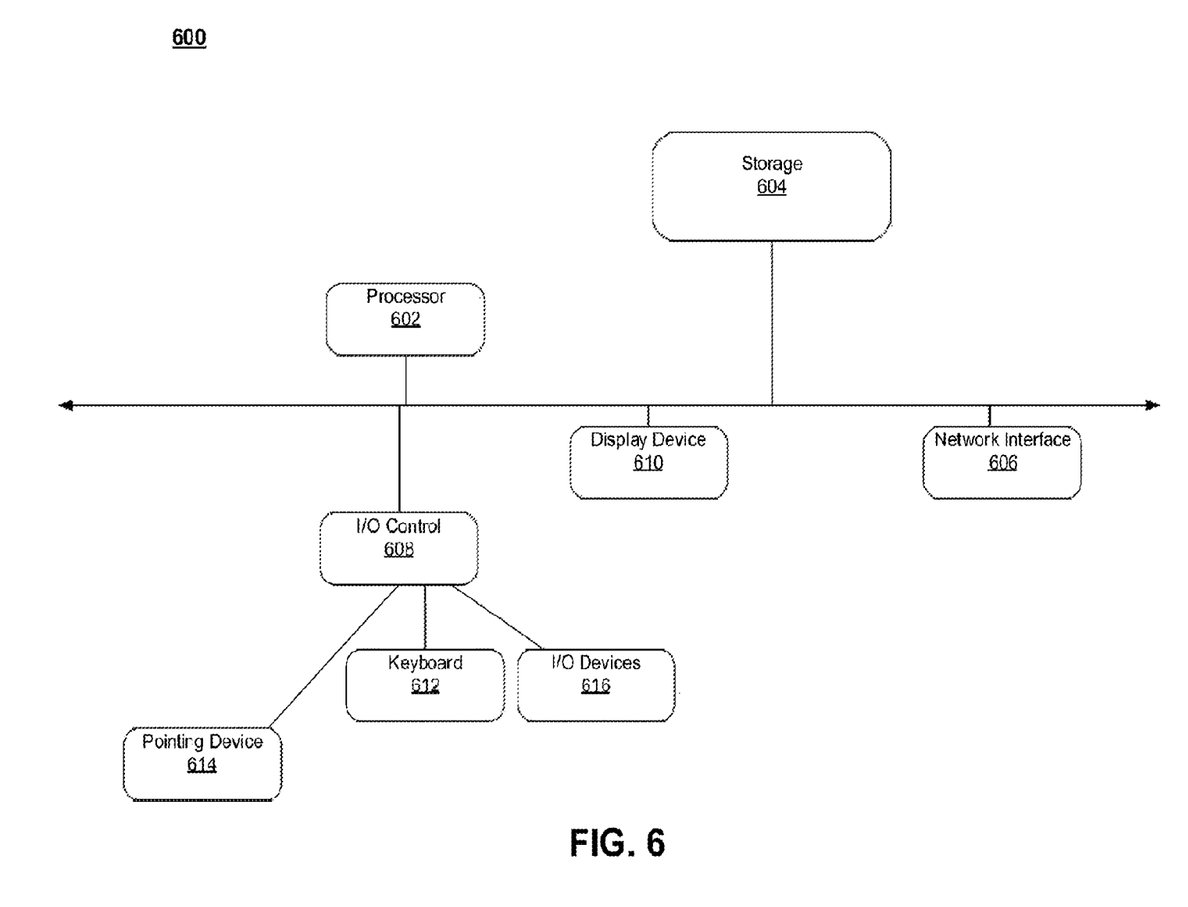
FIG. 6 illustrates a block diagram of a computing device.

FIG. 6 illustrates a block diagram of a computing device 600 for implementing an embodiment of the HDMI source 102, HDMI sink 104, the system 100, transmitter 106, and/or the receiver 108. In some embodiments, the computing device 600 is configured to perform various methods for transporting signals over HDMI. For example, in some embodiments, the computing device 600 is configured to transport signals over TMDS channels. In one implementation, the computing device 600 is configured to generate training differential signals. In another implementation, the computing device 600 is configured to receive training differential signals and analyze the receive training differential signals. In another implementation, the computing device 600 is configured to analyze the receive training differential signals and convey information related to the analysis. In another implementation, the computing device 600 is configured to receive analysis information related to training differential signals. In an implementation, the computing device 600 is configured to alter training differential signals based on the received analysis information related to training differential signals. In one implementation, the analysis information related to training differential signals is conveyed on the DCD.

As shown FIG. 6, the computing device 600 includes a central processing 602, and a main memory unit or storage device unit 604. As shown in FIG. 6, the computing device 600 may include a network interface 606, an I/O controller 608, display devices 610, a keyboard 612, a pointing device 614, such as a mouse, and other I/O devices 616. The storage device 604 may include, without limitation, an operating system and/or software.

The central processing unit 602 is any logic circuitry that responds to and processes instructions fetched from the main memory unit 604. In many embodiments, the central processing unit 602 is provided by a microprocessor unit, such as those manufactured by Intel Corporation of Mountain View, Calif.

Main memory unit 604 may be one or more memory chips capable of storing data and allowing any storage location to be directly accessed by the processor 602, such as any type or variant of Static random access memory (SRAM), Dynamic random access memory (DRAM), Ferroelectric RAM (FRAM), NAND Flash, NOR Flash and Solid State Drives (SSD). The main memory unit 604 may be based on any of the above described memory chips, or any other available memory chips. In the embodiment shown in FIG. 6, the processor 602 communicates with the main memory unit 604 via a system bus.

In the embodiment shown in FIG. 6, the processor 602 communicates with various I/O devices via the system bus. Various buses may be used to connect the central processing unit 602 to any of the I/O devices, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 610, the processor 602 may use HDMI or an advanced graphics port (AGP) to communicate with the display 610.

A wide variety of I/O devices may be present in the computing device 600. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by the I/O controller 608 as shown in FIG. 6. The I/O controller may control one or more I/O devices such as the keyboard 612 and a pointing device 614, e.g., a mouse or optical pen. Furthermore, an I/O device may also provide storage and/or an installation medium for the computing device 600. In still other embodiments, the computing device 600 may provide USB connections (not shown) to receive handheld USB storage.

Referring again to FIG. 6, the computing device 600 may support any suitable installation device, such as a disk drive, a CD-ROM drive, a CD-R/RW drive, a DVD-ROM drive, a flash memory drive, tape drives of various formats, USB device, hard-drive, a network interface, or any other device suitable for installing software and programs, such as the storage 604. The computing device 600 may further include a storage device, such as one or more hard disk drives or redundant arrays of independent disks, for storing an operating system and other related software, and for storing application software programs such as any program or software for implementing (e.g., configured and/or designed for) the systems and methods described herein. Optionally, any of the installation devices could also be used as the storage device. Additionally, the operating system and the software can be run from a bootable medium.

Furthermore, the computing device 600 may include the network interface 606 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 600 communicates with other computing devices 600 via any type and/or form of gateway or tunneling protocol such as Secure Socket Layer (SSL) or Transport Layer Security (TLS). The network interface 606 may include a built-in network adapter, network interface card, PCMCIA network card, card bus network adapter, wireless network adapter, USB network adapter, modem or any other device suitable for interfacing the computing device 600 to any type of network capable of communication and performing the operations described herein.

Figure 7:
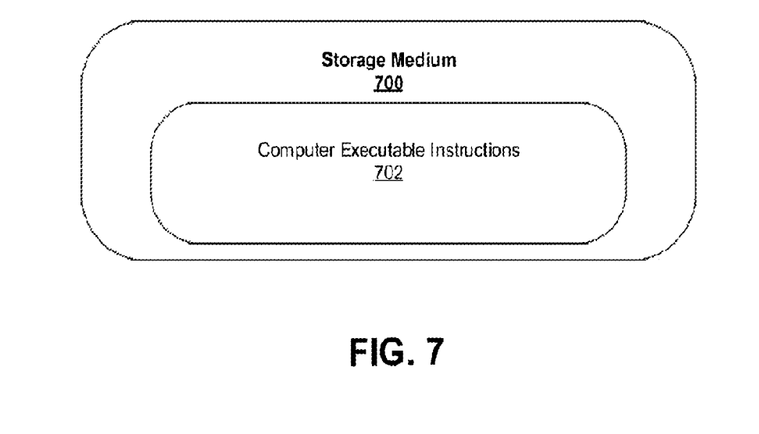
FIG. 7 illustrates an embodiment of a storage medium.

FIG. 7 illustrates an embodiment of a storage medium 700. The storage medium 700 may comprise an article of manufacture. In some examples, the storage medium 700 may include any non-transitory computer readable medium or machine readable medium, such as an optical, magnetic or semiconductor storage. The storage medium 700 may store various types of computer executable instructions e.g., 702). For example, the storage medium 700 may store various types of computer executable instructions to implement skew compensation techniques described herein. The storage medium 700 may be coupled to the computing device 600. For example, when coupled to the computing device 600, the computer executable instructions 702 may be executed by a computing device 600 to aid in performing one or more techniques described herein (e.g., skew compensation).

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
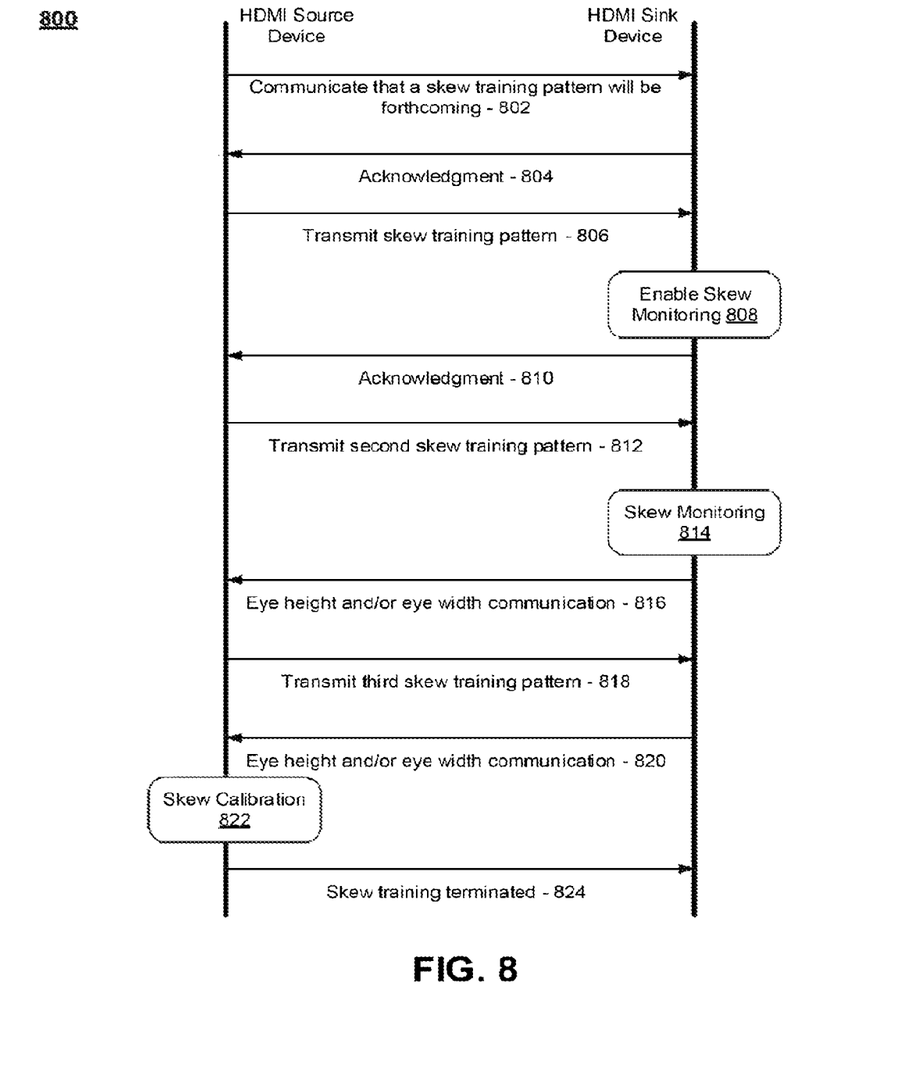
FIG. 8 illustrates a logic flow depicting communication between an HDMI source device and an HDMI sink device.

FIG. 8 illustrates a logic flow 800 depicting communication between an HDMI source device (e.g., the HDMI source 102) and a HDMI sink device (e.g., the HDMI sink 104). The logic flow 800 may begin with communication 802. However, the logic flow 800 may begin with a different communication other than the communication 802. Furthermore, the logic flow 800 is not illustrated in a particular order. A different order other than that illustrated may be used. Some or all of the communications and operations associated with the logic flow 800 may be embodied as one or more computer executable instruction. Such computer executable instructions (e.g., computer executable instructions 702) may be stored in the storage medium 700, or a plurality of disparate storage mediums. A computing device, such as the computing device 600, may execute the stored computer executable instructions. The logic flow 800 may provide functionality to enable compensating for intra-pair skew associated with a differential pair.

At communication 802, the HDMI source device communicates to the HDMI sink device that a skew training pattern signal will be forthcoming. At communication 804, the HDMI sink device acknowledges the communication 802. Generally, communications between the HDMI source device and the HDMI sink device in the logic flow 800 may be made over the DDC or other sideband communication channel. In another embodiment, the HDMI source device may communicate a skew training pattern to the HDMI sink device without first providing a communication to the HDMI sink device that a training pattern signal will be forthcoming.

At communication 806, the HDMI source device transmits or causes the sending of a skew training pattern over one or more of the TMDS channel 0-3 to the HDMI sink device. The skew training pattern may be a differential input signal including a pattern of alternating 1s and 0s. An example of a skew training pattern is illustrated in FIG. 4. However, the skew training pattern illustrated in FIG. 4 is exemplary. In one implementation, the HDMI sink device has prior knowledge of the skew training pattern transmitted or sent by the HDMI source device. In one implementation, the skew training pattern is predetermined.

At block 808, the HDMI sink device enables skew monitoring. In one implementation, in a skew monitoring mode, the HDMI sink device compares the skew training pattern or at least a portion of the skew training pattern received in communication 806 against a baseline eye pattern (e.g., the baseline eye pattern 500). The baseline eye pattern may be stored in a storage medium. More specifically, at block 808, the HDMI sink device measures an eye height and/or eye width associated with the skew training pattern and compares that eye height and/or eye width against the eye height and/or eye width of the baseline eye pattern.

At communication 810, the HDMI sink device acknowledges receiving the skew training pattern of communication 806.

At communication 812, the HDMI source device communicates a second skew training pattern. This second skew training pattern includes a predetermined amount of skew introduced in the skew training pattern. In one example, the HDMI source device shifts at least one of the signals associated with the skew training pattern by a predetermined amount of time in a first time direction. In one implementation, the predetermined amount of time is in the picosecond (ps) range. In a specific implementation, the predetermined amount of time is 10 ps.

At block 814, the HDMI sink device compares the second skew training pattern or at least a portion of the second skew training pattern received in communication 806 against the baseline eye pattern. Specifically, the HDMI sink device measures an eye height and/or eye width associated with the second skew training pattern and compares that eye height and/or eye width against the eye height and/or eye width of the baseline eye pattern. This comparison enables the HDMI sink device to determine if the eye height and/or eye width of the second skew training pattern is an improvement over the eye height and/or eye width determined at block 808.

At communication 816, the HDMI sink device communicates to the HDMI source device a result of the comparison from block 814. Specifically, the HDMI sink device may (1) communicate that the second skew training pattern resulted in an eye height and/or eye width improvement compared to the eye height and/or eye width determined at block 808, or the HDMI sink device may (2) communicate that the second skew training pattern resulted in a degraded eye height and/or eye width compared to the eye height and/or eye width determined at block 808.

At communication 818, if the communication 816 indicated an eye height and/or eye width improvement compared to the eye height determined at block 808, a third skew training pattern is transmitted or caused to be sent including a predetermined amount of skew introduced in the second skew training pattern of communication 812. In one example, the HDMI source device shifts at least one of the signals associated with the second skew training pattern by a predetermined amount of time in the first time direction. In one implementation, the predetermined amount of time is in the picosecond range. In a specific implementation, the predetermined amount of time is 10 ps. The process of shifting at least one of the signals associated with skew training patterns by a predetermined amount of time in the first time direction may be repeated until a point that the HDMI sink device communicates no improvement in eye height and/or eye width.

On the other hand, at communication 818, if the communication 816 indicated a degraded eye height and/or eye width compared to the eye height and/or eye width determined at block 808, a third skew training pattern is transmitted or caused to be sent including a predetermined amount of skew introduced in the skew training pattern of communication 806. In one example, the HDMI source device shifts at least one of the signals associated with the skew training pattern by a predetermined amount of time in a second time direction, that is opposite the first time direction. In one implementation, the predetermined amount of time is in the picosecond range. In a specific implementation, the predetermined amount of time is 10 ps. The process of shifting at least one of the signals associated with skew training patterns by a predetermined amount of time in the second time direction may be repeated until a point that the HDMI sink device communicates no improvement in eye height and/or eye width.

At communication 820, the HDMI sink device communicates that eye height and/or eye width improvement is no longer being observed. At block 822, the HDMI source device calibrates one or more of the signal line associated with one or more of the TMDS channel 0-3 to account for the skew observed by the skew monitoring of the logic flow 800. More specifically, a delay or the like may be introduced to one or more the signal line associated with the one or more of the TMDS channel 0-3 to account for the skew observed by the skew monitoring of the logic flow 800. In another example, the HDMI source device may instruct the HDMI sink device to calibrate one or more of the signal line associated with one or more of that TMDS channel 0-3 to account for the skew observed by the skew monitoring of the logic flow 800. More specifically, the HDMI source device may communicate amount of delay or the like that the HDMI sink device is to introduce to one or more of the signal line associated with the one or more of the TMDS channel 0-3 to account for the skew observed by the skew monitoring of the logic flow 800.

At communication 824, the HDMI source device communicates to the HDMI sink device that that skew training has terminated.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1

A method, comprising: transmitting a skew training pattern on a signal line including a differential pair; and receiving an acknowledgment, related to the skew training pattern, on a display data channel (DDC) associated with an high-definition multimedia interface (HDMI) system.

Example 2

The method according to Example 1, wherein the signal line is a transmission minimized differential signaling (TMDS) channel of the HDMI system.

Example 3

The method according to Example 1, wherein the skew training pattern is a differential signal including a pattern of alternating 1s and 0s.

Example 4

The method according to Example 1, further comprising transmitting a second skew training pattern on the signal line including the differential pair, the second skew training pattern is a modified version of the skew training pattern.

Example 5

The method according to Example 4, wherein the second skew training pattern has a timing offset that is different than a timing offset associated with the skew training pattern.

Example 6

The method according to Example 4, further comprising receiving eye height and/or eye width information related to a comparison of at least a portion of the second skew training pattern against a baseline eye pattern, the eye height and/or eye width information received on the DDC.

Example 7

The method according to Example 6, further comprising transmitting a third skew training pattern on the signal line including the differential pair, the third skew training pattern is a modified version of the second skew training pattern.

Example 8

The method according to Example 6, further comprising transmitting a third skew training pattern on the signal line including the differential pair, the third skew training pattern is a modified version of the skew training pattern.

Example 9

The method according to Example 6, further comprising calibrating the signal line including the differential pair based on the eye height and/or eye width information received on the DDC.

Example 10

At least one non-transitory machine-readable storage medium comprising instructions that when executed by a computing device, cause the computing device to: send a skew training pattern on a signal line including a differential pair; and receive an acknowledgment, related to the skew training pattern, on a display data channel (DDC) associated with an high-definition multimedia interface (HDMI) system.

Example 11

The least one non-transitory machine-readable storage medium of Example 10, wherein the signal line is a transmission minimized differential signaling (TMDS) channel of the HDMI system.

Example 12

The least one non-transitory machine-readable storage medium of Example 10, wherein the skew training pattern is a differential signal including a pattern of alternating 1s and 0s.

Example 13

The least one non-transitory machine-readable storage medium of Example 10, wherein the instructions, when executed by a computing device, cause the computing device to send a second skew training pattern on the signal line including the differential pair, the second skew training pattern is a modified version of the skew training pattern.

Example 14

The least one non-transitory machine-readable storage medium of Example 13, wherein the second skew training pattern has a timing offset that is different than a timing offset associated with the skew training pattern.

Example 15

The least one non-transitory machine-readable storage medium of Example 13, wherein the instructions, when executed by a computing device, cause the computing device to receive eye height and/or eye width information related to a comparison of at least a portion of the second skew training pattern against a baseline eye pattern, the eye height and/or eye width information received on the DDC.

Example 16

The least one non-transitory machine-readable storage medium of Example 15, wherein the instructions, when executed by a computing device, cause the computing device to send a third skew training pattern on the signal line including the differential pair, the third skew training pattern is a modified version of the second skew training pattern.

Example 17

The least one non-transitory machine-readable storage medium of Example 15, wherein the instructions, when executed by a computing device, cause the computing device to send a third skew training pattern on the signal line including the differential pair, the third skew training pattern is a modified version of the skew training pattern.

Example 18

The least one non-transitory machine-readable storage medium of Example 15, wherein the instructions, when executed by a computing device, cause the computing device to calibrate the signal line including the differential pair based on the eye height and/or eye width information received on the DDC.

Example 19

A high-definition multimedia interface (HDMI) source apparatus, comprising: at least one memory; and a processor circuit coupled to the at least one memory, the processor circuit to: transmit a skew training pattern on a signal line including a differential pair; and receive an acknowledgment, related to the skew training pattern, on a display data channel (DDC).

Example 20

The HDMI source apparatus to Example 19, wherein the signal line is a transmission minimized differential signaling (TMDS) channel.

Example 21

The HDMI source apparatus to Example 19, wherein the skew training pattern is a differential signal including a pattern of alternating 1s and 0s.

Example 22

A high-definition multimedia interface (HDMI) apparatus, comprising: at least one memory; and a processor circuit coupled to the at least one memory, the processor circuit to: receive a skew training pattern on a signal line including a differential pair; and transmit an acknowledgment, related to the skew training pattern, on a display data channel (DDC).

Example 23

The HDMI sink apparatus to Example 22, wherein the signal line is a transmission minimized differential signaling (TMDS) channel.

Example 24

The HDMI sink apparatus to Example 22, wherein the skew training pattern is a differential signal including a pattern of alternating 1s and 0s.

Example 25

The HDMI sink apparatus to Example 22, wherein the processor is to compare at least a portion of the skew training pattern against a baseline eye pattern, and the sink is to transmit information related to the comparison on the DDC channel.

Example 26

An apparatus, comprising: at least one memory; and a processor circuit coupled to the at least one memory, the processor circuit to: transmit a skew training pattern on a signal line including a differential pair; and receive an acknowledgment, related to the skew training pattern, on a display data channel (DDC) associated with an high-definition multimedia interface (HDMI) system.

Example 27

The apparatus according to Example 26, wherein the signal line is a transmission minimized differential signaling (TMDS) channel of the HDMI system.

Example 28

The apparatus according to Example 26, wherein the skew training pattern is a differential signal including a pattern of alternating 1s and 0s.

Example 29

The apparatus according to Example 26, wherein the processor is to transmit a second skew training pattern on the signal line including the differential pair, the second skew training pattern is a modified version of the skew training pattern.

Example 30

The apparatus according to Example 29, wherein the second skew training pattern has a timing offset that is different than a timing offset associated with the skew training pattern.

Example 31

The apparatus according to Example 29, wherein the processor is to receive eye height and/or eye width information related to a comparison of at least a portion of the second skew training pattern against a baseline eye pattern, the eye height and/or eye width information received on the DDC.

Example 32

The apparatus according to Example 31, wherein the processor is to transmit a third skew training pattern on the signal line including the differential pair, the third skew training pattern is a modified version of the second skew training pattern.

Example 33

The apparatus according to Example 31, wherein the processor is to transmit a third skew training pattern on the signal line including the differential pair, the third skew training pattern is a modified version of the skew training pattern.

Example 34

The apparatus according to Example 31, wherein the processor is to calibrate the signal line including the differential pair based on the eye height and/or eye width information received on the DDC.

Example 35

A high-definition multimedia interface (HDMI) apparatus, comprising: means to transmit a skew training pattern on a signal line including a differential pair; and means to receive an acknowledgment, related to the skew training pattern, on a display data channel (DDC).

Example 36

The HDMI apparatus to Example 35, wherein the signal line is a transmission minimized differential signaling (TMDS) channel of the HDMI apparatus.

Example 37

The HDMI apparatus to Example 35, wherein the skew training pattern is a differential signal including a pattern of alternating 1s and 0s.

Example 38

A high-definition multimedia interface (HDMI) apparatus, comprising: means to receive a skew training pattern on a signal line including a differential pair; and means to transmit an acknowledgment, related to the skew training pattern, on a display data channel (DDC).

Example 39

The HDMI apparatus to Example 38, wherein the signal line is a transmission minimized differential signaling (TMDS) channel of the HDMI apparatus.

Example 40

The HDMI apparatus to Example 38, wherein the skew training pattern is a differential signal including a pattern of alternating 1s and 0s.

Example 41

The HDMI apparatus to Example 38, wherein the means to receive is to compare at least a portion of the skew training pattern against a baseline eye pattern, and the sink is to transmit information related to the comparison on the DDC channel.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
   transmitting a skew training pattern on a signal line including a differential pair;
   receiving an acknowledgment, related to the skew training pattern, on a display data channel (DDC) associated with a high-definition multimedia interface (HDMI) system; and
   transmitting a second skew training pattern on the signal line including the differential pair, the second skew training pattern is a modified version of the skew training pattern.

2. The method according to claim 1, wherein the signal line is a transmission minimized differential signaling (TMDS) channel of the HDMI system.

3. The method according to claim 1, wherein the skew training pattern is a differential signal including a pattern of alternating 1s and 0s.

4. The method according to claim 1, wherein the second skew training pattern has a timing offset that is different than a timing offset associated with the skew training pattern.

5. The method according to claim 1, further comprising receiving eye height and/or eye width information related to a comparison of at least a portion of the second skew training pattern against a baseline eye pattern, the eye height and/or eye width information received on the DDC.

6. The method according to claim 5, further comprising transmitting a third skew training pattern on the signal line including the differential pair, the third skew training pattern is a modified version of the second skew training pattern.

7. The method according to claim 5, further comprising transmitting a third skew training pattern on the signal line including the differential pair, the third skew training pattern is a modified version of the skew training pattern.

8. The method according to claim 5, further comprising calibrating the signal line including the differential pair based on the eye height and/or eye width information received on the DDC.

9. At least one non-transitory machine-readable storage medium comprising instructions that when executed by a computing device, cause the computing device to:
   send a skew training pattern on a signal line including a differential pair;
   receive an acknowledgment, related to the skew training pattern, on a display data channel (DDC) associated with an high-definition multimedia interface (HDMI) system; and
   send a second skew training pattern on the signal line including the differential pair, the second skew training pattern is a modified version of the skew training pattern.

10. The at least one non-transitory machine-readable storage medium of claim 9, wherein the signal line is a transmission minimized differential signaling (TMDS) channel of the HDMI system.

11. The at least one non-transitory machine-readable storage medium of claim 9, wherein the skew training pattern is a differential signal including a pattern of alternating 1s and 0s.

12. The at least one non-transitory machine-readable storage medium of claim 9, wherein the second skew training pattern has a timing offset that is different than a timing offset associated with the skew training pattern.

13. The at least one non-transitory machine-readable storage medium of claim 9, wherein the instructions, when executed by a computing device, cause the computing device to receive eye height and/or eye width information related to a comparison of at least a portion of the second skew training pattern against a baseline eye pattern, the eye height and/or eye width information received on the DDC.

14. The at least one non-transitory machine-readable storage medium of claim 13, wherein the instructions, when executed by a computing device, cause the computing device to send a third skew training pattern on the signal line including the differential pair, the third skew training pattern is a modified version of the second skew training pattern.

15. The at least one non-transitory machine-readable storage medium of claim 13, wherein the instructions, when executed by a computing device, cause the computing device to send a third skew training pattern on the signal line including the differential pair, the third skew training pattern is a modified version of the skew training pattern.

16. The at least one non-transitory machine-readable storage medium of claim 13, wherein the instructions, when executed by a computing device, cause the computing device to calibrate the signal line including the differential pair based on the eye height and/or eye width information received on the DDC.

17. A high-definition multimedia interface (HDMI) source apparatus, comprising:
   at least one memory; and
   a processor circuit coupled to the at least one memory, the processor circuit to:
      transmit a skew training pattern on a signal line including a differential pair;
      receive an acknowledgment, related to the skew training pattern, on a display data channel (DDC); and transmit a second skew training pattern on the signal line including the differential pair, the second skew training pattern is a modified version of the skew training pattern.

18. The HDMI source apparatus to claim 17, wherein the signal line is a transmission minimized differential signaling (TMDS) channel.

19. The HDMI source apparatus to claim 17, wherein the skew training pattern is a differential signal including a pattern of alternating 1s and 0s.

20. A high-definition multimedia interface (HDMI) sink apparatus, comprising:
   at least one memory; and
   a processor circuit coupled to the at least one memory, the processor circuit to:
     receive a skew training pattern on a signal line including a differential pair;
     transmit an acknowledgment, related to the skew training pattern, on a display data channel (DDC);
     receive a second skew training pattern on the signal line including the differential pair, the second skew training pattern is a modified version of the skew training pattern.

21. The HDMI sink apparatus to claim 20, wherein the signal line is a transmission minimized differential signaling (TMDS) channel.

22. The HDMI sink apparatus to claim 20, wherein the skew training pattern is a differential signal including a pattern of alternating 1s and 0s.

23. The HDMI sink apparatus to claim 20, wherein the processor circuit is to compare at least a portion of the skew training pattern against a baseline eye pattern, and transmit information related to the comparison on the DDC channel.

* * * * *